April 5, 1960 R. VERMEULEN ET AL 2,931,862
SOUND REPRODUCTION SYSTEM
Filed July 29, 1957
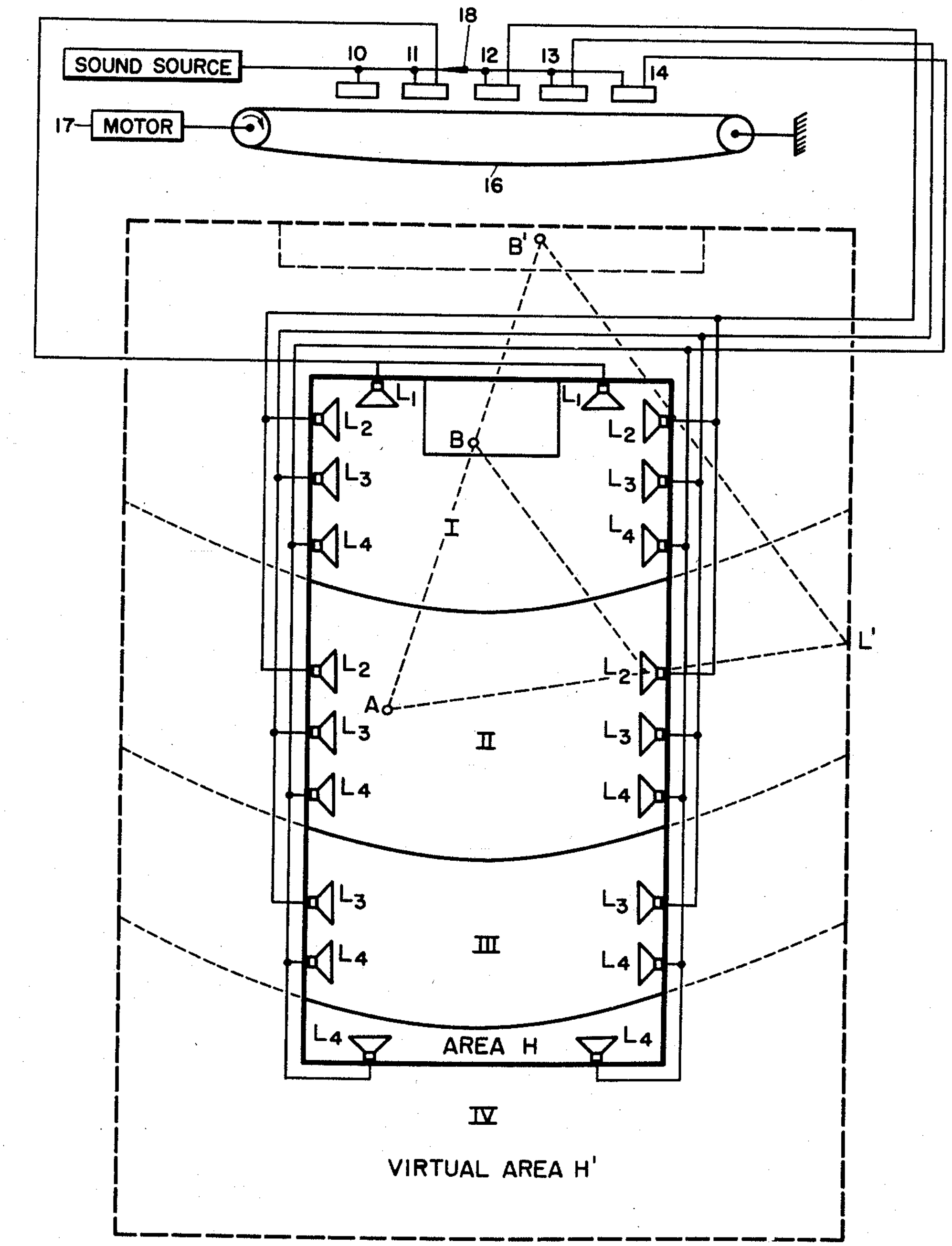
INVENTORS
ROELOF VERMEULEN
DERK KLEIS
BY
Frank R. Jifari
AGENT

United States Patent Office

2,931,862
Patented Apr. 5, 1960

2,931,862

SOUND REPRODUCTION SYSTEM

Roelof Vermeulen and Derk Kleis, Eindhoven, Netherlands, assignors to North American Philips Company, Inc., Irvington-on-Hudson, N.Y.

Application July 29, 1957, Serial No. 674,700

6 Claims. (Cl. 179—1)

This application is a continuation-in-part of the co-pending patent application Serial No. 468,095, filed November 10, 1954.

The present invention relates to a sound reproduction system. More particularly, the present invention relates to a system for recording sound oscillations on a magnetic recording medium such as, for example, magnetic tape, with a view to reproducing the recorded sound by means of a number of loudspeakers which are distributed over the reproducing space in a predetermined manner. Use may advantageously be made of a loop-shaped magnetic tape on which a recording head records a sound signal after the recording medium moves past an erasing head. Such a loop-shaped tape may naturally be used continuously and may be inexpensive and occupy little space due to its small length. The scanning of the recorded signal occurs by moving the recording medium past a plurality of reproducing heads connected to the loudspeakers.

In a concert hall in which an orchestra plays on the stage and in which one or a plurality of walls are acoustically soft, due to upholstering, boxes on a wall, etc., the walls have an undue damping effect on sound. This is evident when the music is either suddenly hushed or continuous pianissimo occurs after a loud passage. In such a case, the loud and soft passages of music do not flow smoothly into each other and the hall is said to be too dead. This is actually due to the undue absorption of incident sound by the walls with the resultant unduly weak reflection of sound thereby.

It is desirable that a loudspeaker be provided on such a wall to radiate the desired acoustic energy by volume control. In the concert hall, sound coming from a loudspeaker on a wall should not start simultaneously with the sound transmitted directly from the source to the listener, but it should be retarded or delayed in time. Therefore, it is possible for all the walls to be provided with loudspeakers. The required retardation is achieved by connecting the loudspeakers in a specific manner to reproducing heads positioned at selected intervals along the record tape.

If the retardations or time delays of the loudspeakers are maintained at 50 milliseconds or less, the sound makes a diffuse on continuous impression, since time differences less than 50 milliseconds are not distinguishable by the human ear. The reproducing heads at a given tape speed are positioned at mutual distances corresponding to time delays of, for example, 40 milliseconds along the tape. Since 40 milliseconds corresponds to a path length of 13 meters, the hall may be divided into zones. Loudspeakers placed within a radius of 13 meters from the source of sound are connected to the first reproducing head adjacent the recording head; loudspeakers placed within a radius range of 13 to 26 meters from the source of sound are connected to the second reproducing head next adjacent the recording head, etc. Usually, four reproducing heads are sufficient and the retardation of each group may be increased if a plurality of loudspeakers form a group.

The acquired effect of artificial reflections which provides diffuse sound due to the plurality of loudspeakers, does not eliminate the sudden hushing of the sound. For faithful reproduction of sound it is necessary for the sound to fade out. Such fading out is known as reverberation. The reverberation time is that in which the sound decreases 60 db in level. The reverberation effect may be provided by feeding back the sound, by a factor less than 1, from one or more of the reproducing heads to the recording head.

For artificial acoustic area enlargement, the retardation or time delay of sound should be matched to the artificial walls which are more remote from the listener than are the actual walls. This may be achieved, in a simple manner, by reducing the speed of the tape. If the retardation between reproducing heads is assumed to be 40 milliseconds, the reduced tape speed will produce a time delay between reproducing heads of 80 milliseconds, for example. This may result in an interfering echo effect, but if a sufficient number of loudspeakers are connected to a single reproducing head, the impression on the listener is the same as if a plurality of reproducing heads with a small mutual time delay, of for example, 2 milliseconds, replace the single reproducing head. The intensity ratio of the direct and indirect sound should be matched to the distance between the sound source or loudspeakers and the listener.

If the sound has a certain reverberation, such as sound recorded with a natural reverberation; or, if the loudspeakers radiate towards the ceiling so that path length differences occur; or, if the hall has a certain reverberation, the time delay between the reproducing heads may be further increased so that the speed of the tape may be reduced by one-half or one-third.

The present invention is based on the recognition that an observer has the impression of being acoustically in an area of given size as a result of the observed delays with which signals simultaneously supplied by a sound source are reflected by the walls. In connection with this phenomenon, from which it is found that the area size is intimately related with the travel-time differences of sound waves, applicant has succeeded in obtaining reflections from virtual walls, thus changing the apparent size of the acoustic area. The area suggested by the said virtual walls is termed the virtual acoustic area.

By changing the size of the virtual acoustic area, the reverberation or fade out time will change proportionally. None the less, there may be a need for independent variations of the reverberation time. A listener in the living room who, in accordance with the invention, has caused the size of the virtual acoustic area to simulate, for example, a large church building, will, by choosing appropriate intensities of the loudspeakers, obtain a corresponding reverberation time.

In accordance with the present invention, this condition is fulfilled by adjusting or varying the reverberation time, corresponding to the virtual area, through feedback from one or more reproducing heads to the recording head. Stronger feedback gives rise to a longer repeated signal and corresponds to acoustically harder walls of the virtual area. Moreover, the number of reflections from virtual walls can be increased considerably without increasing the number of reproducing heads accordingly.

In accordance with the invention, the loudspeakers are positioned and connected in a predetermined manner in suitable sequence to the reproducing elements and the sound oscillations are recorded on the tape with suitable mutual time delay and intensity in a manner such that by the cooperation of the loudspeakers, a virtual acoustic area of the desired size is obtained. The listener may thus be given the illusion of a larger enclosed area than that in which he is present. The provision of a virtual acoustic area of a desired size is aided by the selection of the spacing distance of the recording head from the individual reproducing heads and/or by variation of the speed of the recording medium.

The principal object of the present invention is the production of space effects in reproduced sound.

An object of the present invention is the production of artificial reflections in reproduced sound.

Another object of the present invention is the reproduction of sound signals with great intelligibility.

Still another object of the present invention is the production of space effects in reproduced sound with great efficiency and economy of operation.

In order that the invention may be readily carried into effect, it will now be described, by way of example, with reference to the accompanying drawing wherein the figure is a schematic diagram of an embodiment of the sound reproducing system of the present invention.

In the figure, A represents a person within an enclosed area H which contains a plurality of loudspeakers $L_1$, $L_2$, $L_3$ and $L_4$ reproducing the same signal with relative time delays. The loudspeakers are positioned in a first series of groups in accordance with their distance from the source of sound B. If the area H is assumed to be 25 by 40 meters in area, four zones may be assumed to exist. Thus, the first series of groups comprises those in zones I, II, III and IV, respectively; so that the first pair of groups each comprise the loudspeakers $L_1$, $L_2$, $L_3$ and $L_4$, the second pair of groups each comprise the loudspeakers $L_2$, $L_3$ and $L_4$; the third pair of groups each comprise the loudspeakers $L_3$ and $L_4$; and the fourth pair of groups each comprise the loudspeakers $L_4$. The loudspeakers are connected in a second series of groups in accordance with the selected time delays in the reproduction of sound. Thus, the second series of groups comprises the loudspeakers of the first series of groups. Of the second series of groups, the first group comprises the loudspeakers $L_1$ connected to a reproducing head 11, the second pair of groups each comprise two loudspeakers $L_2$ connected to a reproducing head 12, the third pair of groups each comprise three loudspeakers $L_3$ connected to a reproducing head 13 and the fourth pair of groups each comprise four loudspeakers $L_4$ connected to a reproducing head 14.

The loudspeakers $L_1$ may be imagined to be supplied in a direct manner with the recorded sound signal to be reproduced; the other loudspeakers receiving the recorded signal each individually with relative time delays. The dotted line BA in the figure represents the path along which the sound reaches the observer direct from the sound source B; the line $L_2A$ indicates the direct sound path from the loudspeaker $L_2$.

If the listener A sits in zone I, the difference in path between the direct sound and the indirect sound is at the most 13 meters and the loudspeakers $L_1$ should be delayed by 40 milliseconds with respect to a sound source B. For a listener in zone II, the difference in distance between the direct and the indirect sound is at the most also 13 meters. Since the direct sound heard by a listener in zone II must cover a path which is 13 meters longer than that of the direct sound heard by a listener in zone I, the loudspeakers $L_2$ must be delayed in time by a total of 80 milliseconds with respect to sound source B. Thus, the primary sound reproduction is provided in the various zones by the second series of loudspeaker groups $L_1$, $L_2$, $L_3$ and $L_4$. The secondary sound reproduction is the indirect sound which is reflected twice before it reaches the listener. In zone I, the mean difference in path is thus 26 meters, so that the loudspeaker concerned should be delayed in time by 80 milliseconds with respect to sound source B. The secondary sound reproduction is provided by loudspeakers $L_2$ in zone I, loudspeakers $L_3$ in zone II and loudspeakers $L_4$ in zone III. Tertiary sound reproduction is provided by loudspeakers $L_3$ in zone I and by loudspeakers $L_4$ in zone II. Quaternary sound reproduction is provided by loudspeakers $L_4$ in zone I. Due to the feedback to the recording head 10, sound reproductions of higher order are provided until the initial signal is reduced in level by 60 db. The total reproduction time of all orders until the 60 db level drop is the reverberation time.

The figure shows a virtual acoustic area H′. If the time difference with which waves following the paths BA and $L_2A$ reach the ear is the same as if source B were positioned in the area H′ and the sound waves would have followed the paths B′A and L′A, respectively, the observer has the impression of being in the area H′. If the area H is virtually enlarged to the area H′, the sound source B is virtually at B′. This effect is strengthened by a correct ratio between the intensities of the direct and indirect sound. The time delay of loudspeaker $L_2$, for example, with respect to B, in order to give the impression that the sound originates from B′ and is reflected at L′, is determined by the path difference $B'L'+L'L_2-BB'$.

It is found that in the various zones the time delays required by the primary sound reproductions are doubled and quadrupled for the secondary sound reproduction, etc., with respect to sound source B. This would necessitate the connection of loudspeakers $L_1$ to reproducing head 12 and loudspeakers $L_2$ to reproducing head 14, or the doubling of the relative distances between the reproducing heads. In such case, it is simpler to reduce the driving speed of the tape by half.

In accordance with the invention, delay times are obtained in a simple manner by choosing accordingly the spacing between the recording head 10 and the individual reproducing heads 11, 12, 13 and 14 and/or varying the speed of the recording medium 16 by means of a motor 17. In the presence of feedback of the signal from one or more reproducing heads 11, 12, 13 and 14 to the recording head 10, the hardness of the walls of the virtual area H′ is adjustable. It will be evident that the virtual area H′ may also exist in the absence of the walls of the area H; that is, the loudspeakers may be positioned in the open.

While the invention has been described by means of a specific example and in a specific embodiment, we do not wish to be limited thereto, for obvious modifications will occur to those skilled in the art without departing from the spirit and scope of the invention.

What we claim is:

1. A sound reproduction system for an enclosed area comprising a magnetic recording medium, means for recording sound signals on said medium, means for scanning said medium comprising a plurality of reproducing heads positioned in operative relation to said medium, a plurality of loudspeakers positioned along the boundaries of said area for reproducing the sound recorded on said medium, means for connecting each of the reproducing heads to selected ones of said loudspeakers, said area being divided into a plurality of zones with a direct sound source being located in the first zone, the length of each zone being defined by the path length of sound corresponding to a time difference below which delayed sound from two sources makes a diffuse impression on the human ear, a first pair of loudspeakers being located in said first zone and being connected to a reproducing head having a first time delay relative to said recorded sound, additional pairs of loudspeakers located respectively in succeeding zones, each of said additional pairs being connected to a reproducing head having a time delay successively greater than said first time delay, and further loudspeakers in each of said zones, said further loudspeakers having time delays greater than said pairs of loudspeakers.

2. A reproduction system as claimed in claim 1, wherein the signal from each of said reproducing heads is fed back to said recording means.

3. A reproduction system as claimed in claim 2, further comprising means for varying the rate at which said reproducing heads scan said medium, whereby the virtual acoustic area may be varied.

4. A sound reproduction system for an enclosed area comprising a magnetic recording medium, means for scanning said medium comprising a plurality of reproducing heads positioned adjacent each other in operative relation to said medium, the sound signals from each of said reproducing heads having a distinctive time delay, a plurality of loudspeakers positioned along the boundaries of said area, means for connecting each of the reproducing heads to selected ones of said loudspeakers, the loudspeakers being positioned in zones adjacent to each other with a different group of loudspeakers in each zone, a first group containing loudspeakers connected to all of said reproducing heads, and each succeeding group containing loudspeakers connected to one less reproducing head than each preceding group.

5. A sound reproduction system as claimed in claim 4, wherein the sound signal from each of said reproducing heads is fed back to said recording means.

6. A sound reproduction system as claimed in claim 4, further comprising means for varying the rate at which said reproducing heads scan said medium, whereby the virtual acoustic area may be varied.

References Cited in the file of this patent

UNITED STATES PATENTS

| | | |
|---|---|---|
| 1,358,053 | Bascom | Nov. 9, 1920 |
| 2,327,956 | Begun | Aug. 24, 1943 |
| 2,419,894 | Hayes | Apr. 29, 1947 |
| 2,767,254 | Lafferty | Oct. 16, 1956 |